(12) United States Patent
Jung (10) Patent No.: US 8,457,045 B2
(45) Date of Patent: Jun. 4, 2013

(54) METHOD FOR TRANSMITTING DATA USING DOWNLINK DUMMY CONTROL BLOCK AND SYSTEM USING THE SAME

(75) Inventor: Joon Young Jung, Yongin-si (KR)

(73) Assignee: Samsung Electronics Co., Ltd (KR)

(*) Notice: Subject to any disclaimer, the term of this patent is extended or adjusted under 35 U.S.C. 154(b) by 857 days.

(21) Appl. No.: 12/276,918

(22) Filed: Nov. 24, 2008

(65) Prior Publication Data

US 2009/0141672 A1    Jun. 4, 2009

(30) Foreign Application Priority Data

Nov. 26, 2007   (KR) .................. 10-2007-0120920

(51) Int. Cl.
*H04W 4/00*   (2009.01)
(52) U.S. Cl.
USPC .......................................... 370/328; 370/338
(58) Field of Classification Search
USPC .......................................... 370/252, 310–350
See application file for complete search history.

(56) References Cited

U.S. PATENT DOCUMENTS

| | | | |
|---|---|---|---|
| 6,671,284 B1* | 12/2003 | Yonge et al. | 370/462 |
| 7,362,725 B2* | 4/2008 | Lintulampi et al. | 370/329 |
| 7,693,126 B2* | 4/2010 | Cayla et al. | 370/346 |
| 2002/0141359 A1* | 10/2002 | Jei | 370/329 |
| 2003/0198199 A1* | 10/2003 | Budka et al. | 370/329 |
| 2004/0090948 A1* | 5/2004 | Forssell et al. | 370/349 |
| 2004/0120302 A1* | 6/2004 | Sebire et al. | 370/347 |
| 2007/0097929 A1* | 5/2007 | Dunko et al. | 370/338 |
| 2007/0206624 A1* | 9/2007 | Majima | 370/433 |
| 2008/0089281 A1* | 4/2008 | Yoon et al. | 370/329 |
| 2008/0130617 A1* | 6/2008 | Singh et al. | 370/345 |
| 2009/0034462 A1* | 2/2009 | Kalden et al. | 370/329 |
| 2009/0130979 A1* | 5/2009 | Bhushan et al. | 455/63.1 |
| 2009/0268706 A1* | 10/2009 | Featherstone et al. | 370/345 |
| 2010/0227616 A1* | 9/2010 | Hanov et al. | 455/437 |
| 2012/0147819 A1* | 6/2012 | Sundberg | 370/328 |

FOREIGN PATENT DOCUMENTS

| | | |
|---|---|---|
| WO | WO 00/16435 | 3/2000 |
| WO | WO 02/09463 | 1/2002 |

OTHER PUBLICATIONS

3GPP TS 44.060 Version 7.10.0 Release 7, ETSI TS 144 060 V7.10.0, Oct. 2007.

* cited by examiner

*Primary Examiner* — Warner Wong
(74) *Attorney, Agent, or Firm* — The Farrell Law Firm, P.C.

(57) ABSTRACT

A method for transmitting data using a downlink dummy control block and a system using the same. The method includes receiving, by a Base Station, data to be broadcast to Mobile Stations (MSs) from a mobile communication service provider server, and inserting, by the BS, the received data into a padding bit field within a downlink dummy control block and broadcasting the downlink dummy control block to the MSs.

10 Claims, 10 Drawing Sheets

METHOD FOR TRANSMITTING DATA USING DOWNLINK DUMMY CONTROL BLOCK AND SYSTEM USING THE SAME

PRIORITY

This application claims priority under 35 U.S.C. §119 to an application entitled "METHOD FOR TRANSMITTING DATA USING DOWNLINK DUMMY CONTROL BLOCK AND SYSTEM USING THE SAME", filed in the Korean Intellectual Property Office on Nov. 26, 2007 and assigned Serial No. 10-2007-0120920, the contents of which are incorporated herein by reference.

BACKGROUND OF THE INVENTION

1. Field of the Invention

The present invention relates to a method for transmitting data and a system and terminal using the same, and more particularly, to a method for transmitting data in a General Packet Radio Service (GPRS)/Enhanced Data for Global System for Mobile (GSM) Evolution (EDGE) based communication system.

2. Description of the Related Art

GPRS is a 2.5-Generation (2.5G) mobile telephone technology enabling ultra high-speed Internet and video communication. EDGE is a 2.5G GSM communication technology. GPRS provides a higher transmission speed than an earlier 2nd-Generation (2G) mobile telephone technology and enables connections to the Internet, etc., any time using a packet switched technology.

Figure 1:
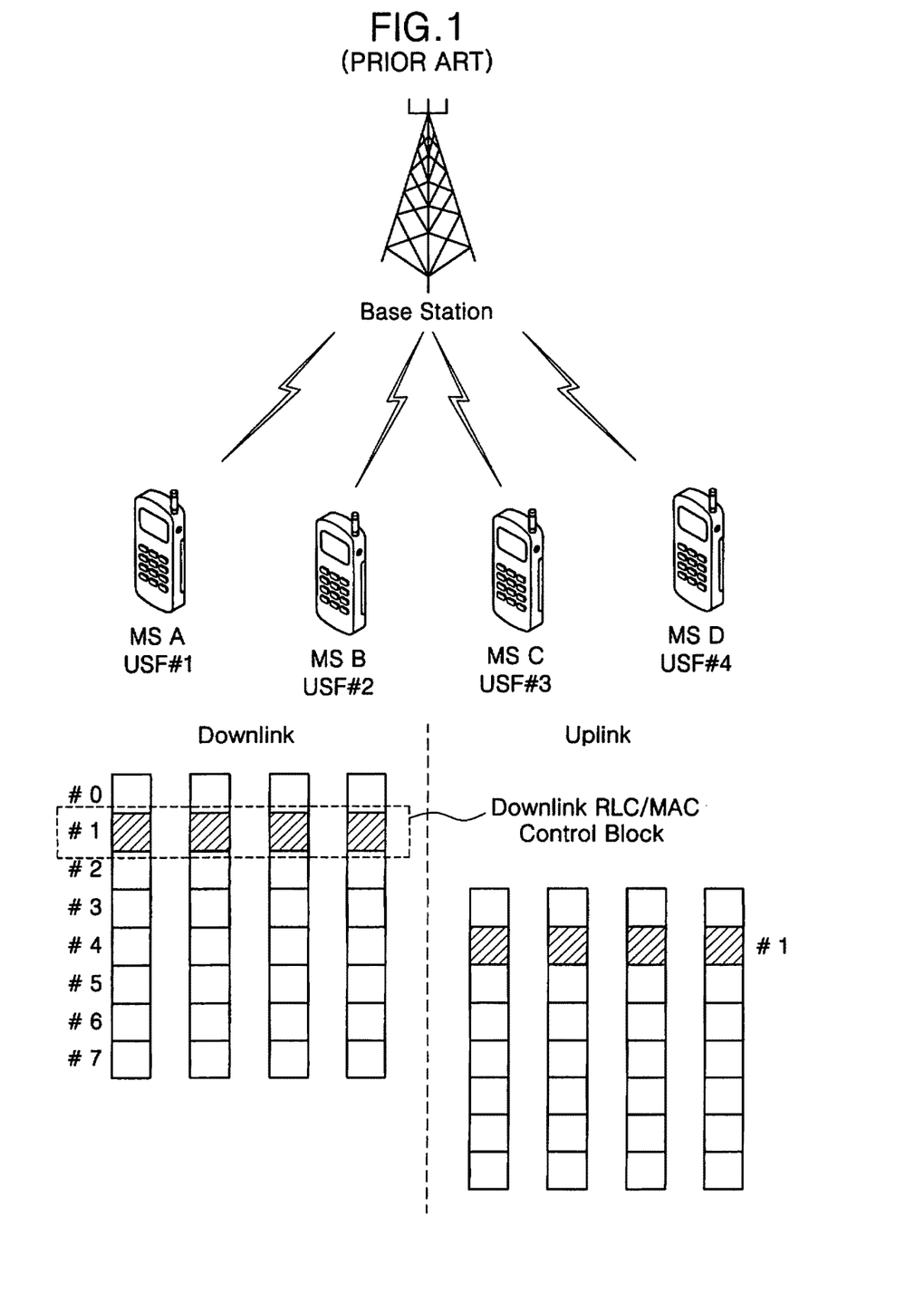
FIG. 1 is a diagram illustrating a scheme for transmitting a downlink dummy control block according to the conventional art.

FIG. 1 is a diagram illustrating a scheme of transmitting a downlink dummy control block according to the conventional art.

A Base Station (BS) broadcasts downlink dummy control blocks to a plurality of Mobile Stations (MSs) located within its own coverage.

The downlink dummy control blocks are used to allocate an Uplink State Flag (USF) in an uplink Temporary Block Flow (TBF) mode following channel dynamic allocation. Also, the downlink dummy control blocks are one type of dummy control block transmitted when a downlink TBF is established but there is no longer a Radio Link Control (RLC)/Medium Access Control (MAC) block.

A downlink channel is a channel used for transmission from a BS to an MS, and an uplink channel is a channel used for transmission from an MS to the BS. Each of the downlink dummy control blocks includes USF information. The MS refers to the downlink is dummy control block when communicating with the BS over an uplink channel.

There are several MSs within a coverage area or cell of one BS. The BS transmits a downlink dummy control block including a USF to the MSs within the cell several times per second because of a frequent change of a channel use state of each MS.

As shown in FIG. 1, MS A, MS B, MS C, and MS D are within a coverage area of the BS. The MSs are assigned USF numbers USF#1, USF#2, USF#3, and USF#4, respectively.

MS A refers to a block burst #1 of downlink dummy control blocks, broadcast from the BS, in order to perform an uplink communication with the BS. Through coding, block bursts #1 becomes a downlink RLC/MAC control block. A description of the downlink RLC/MAC control block is made below in detail with reference to FIG. 2.

MS B may refer to block bursts #2 of the downlink dummy control block to perform an uplink data communication with the BS.

Figure 2:
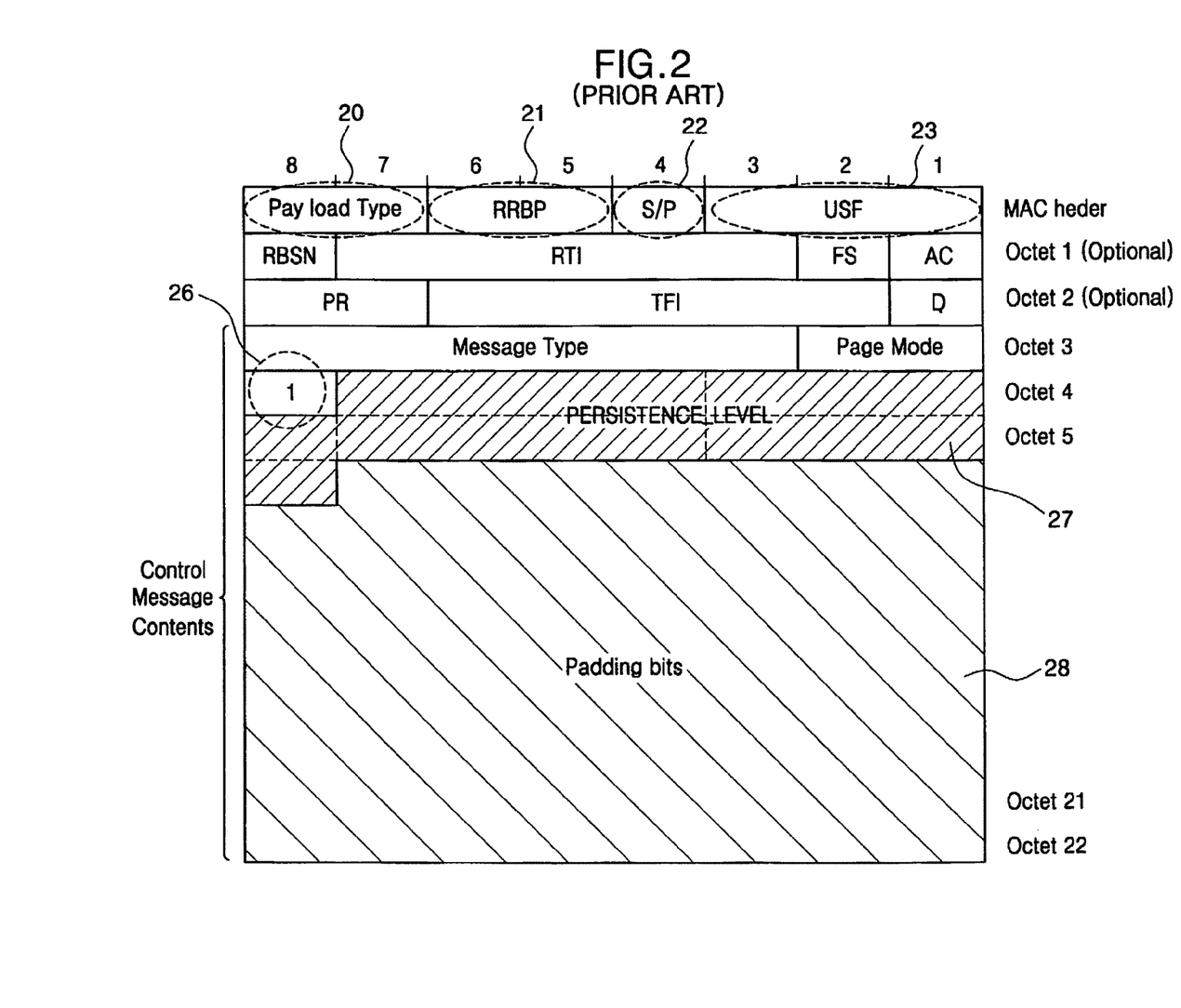
FIG. 2 is a diagram illustrating an example of a downlink dummy control block according to the conventional art.

FIG. 2 is a diagram illustrating an example of a downlink dummy control block according to the conventional art.

As shown in FIG. 2, the downlink dummy control block includes an MAC header and a plurality of octets. The MAC header includes a Payload Type (PT) 20, a Relative Reserve Block Period (RRBP) 21, a Supplementary Polling (S/P) 22 and a USF 23. The configuration of the MAC header is defined in the GSM 44.060 standard specification.

The PT 20 indicates whether or not a block broadcast from a BS to an MS is a data block or a control block. The RRBP 21 contains information on a time at which an MS is to respond to whether or not the MS receives a signal from the BS. The S/P 22 contains information on whether or not the RRBP 21 is activated. The USF 23 contains a state flag that the MS refers to when performing uplink data communication with a BS as described in FIG. 1.

In FIG. 2, "RBSN," "RTI," "FS," "AC," "PR," "TFI" and "D" are parameters optionally included in the downlink dummy control block.

Control message contents are added to a rear field of the MAC header of the downlink dummy control block. A configuration scheme of the control message contents in GPRS/EDGE based communication is described below.

```
< Message Type : bit (6) >
< Packet Downlink Dummy Control Block message content > ::=
< PAGE_MODE : bit (2) >
{ 0 | 1 <PERSISTENCE_LEVEL : bit (4) > * 4 }
< padding bits >
! < Distribution part error : bit (*) = < no string > > ;
```

Referring to the configuration scheme of the control message contents and FIG. 2, information on a message type is allocated 6 bits, and information on a page mode is allocated 2 bits. A persistence level 27 is information necessary for an MS to access a network. The control message contents also include a bit 26 for deciding whether or not to insert persistence level information into the downlink dummy control block broadcast by the BS. The persistence level 27 is composed of a combination of four 4-bit strings and therefore, is expressed as "<PERSISTENCE_LEVEL:bit (4)>*4."

As shown in FIG. 2, all remnant fields are filled with padding bits 28 after the MAC header information, the optionally inserted octet string, the message type, the page mode and the persistence level 27 are inserted into the downlink dummy control block.

The padding bits 28 do not contain special information and are mere fillers for adaptation to a defined frame of the downlink dummy control block. The downlink dummy control block is broadcast from a BS to MSs with the meaningless padding bits 28. Therefore, there is a problem of causing a waste of radio resources allocated to the MSs.

Among recent services provided to MS users, there is a life information service for continuously updating and providing brief news information, weather information, stock price information, etc. and displayed on a part of a display of an MS.

In the life information service, content provided is composed of a small capacity of data and is broadcast from a BS to an MS. However, separate traffic resources have to be allocated for the life information service, and therefore, there is a problem of deteriorating the use efficiency of radio resources.

SUMMARY OF THE INVENTION

The present invention solves the foregoing problems of the prior art and is directed to a method for transmitting data using a downlink dummy control block and a system and terminal using the same.

According to an aspect of the invention, there is provided a method for transmitting downlink data in a General Packet Radio Service (GPRS)/Enhanced Data for GSM Evolution (EDGE) based mobile communication system. The method includes receiving, by a Base Station, data to be broadcast to Mobile Stations (MSs) from a mobile communication service provider server, and inserting, by the BS, the received data into a padding bit field within a downlink dummy control block and broadcasting the downlink dummy control block to the MSs.

An identification bit for indicating the insertion of the received data or a flag for indicating the start of the inserted data may be inserted into the broadcast downlink dummy control block.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described herein below with reference to the accompanying drawings. In the following description, well-known functions or constructions are not described in detail since they would obscure the invention in unnecessary detail. In the description of the invention with reference to the drawings, the same reference numbers are used to depict elements having the same functions.

Figure 3:
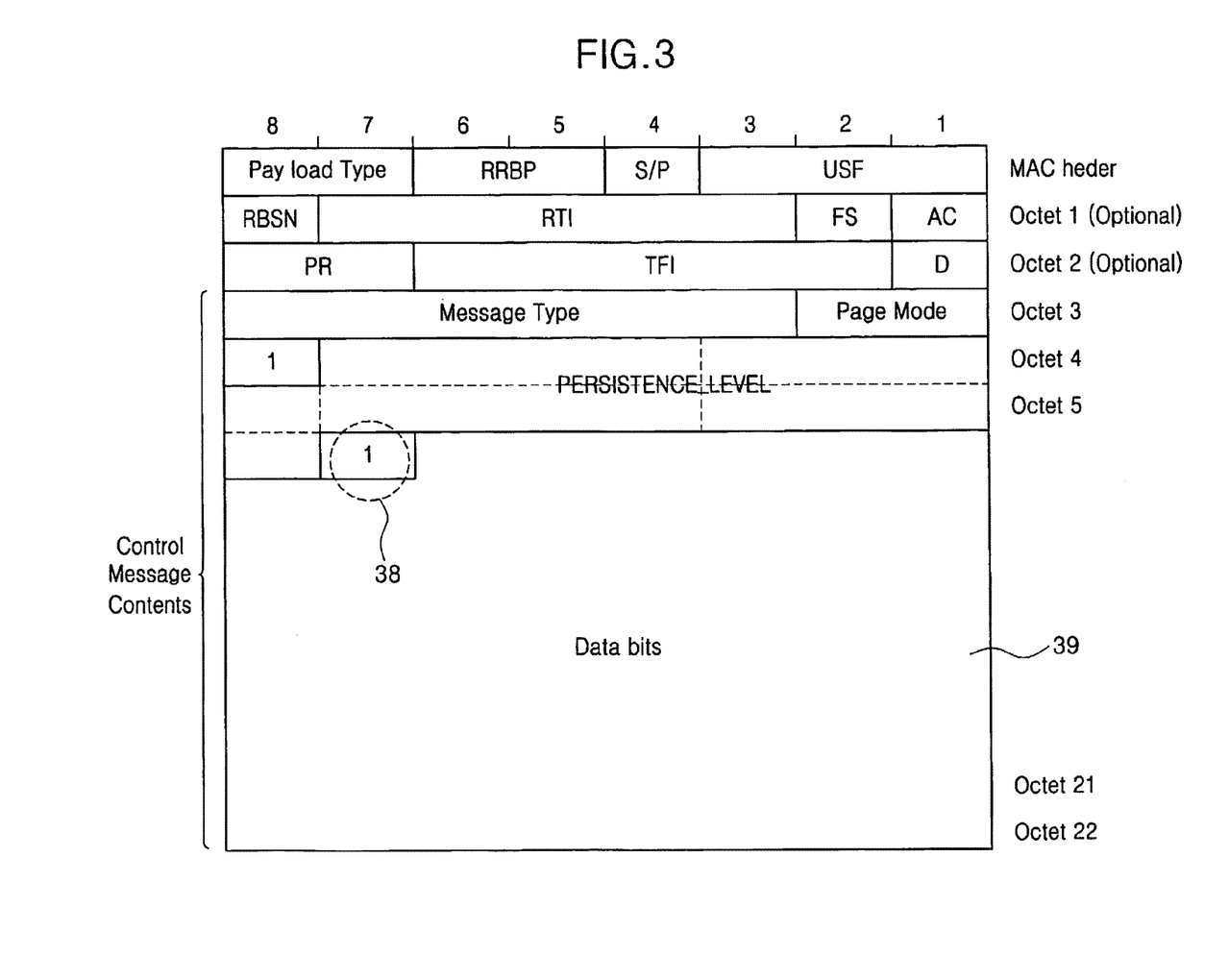
FIG. 3 is a diagram illustrating a structure of a downlink dummy control block according to an exemplary embodiment of the present invention.

FIG. 3 is a diagram illustrating a structure of a downlink dummy control block according to an exemplary embodiment of the present invention.

As shown in FIG. 3, the downlink dummy control block includes an MAC header, optionally added octets, and control message contents. The MAC header has a payload type, an RRBP, an S/P, and a USF.

The MAC header having the payload type, the RRBP, the SIP, and the USF is the same as that of FIG. 2. The MAC header has a construction based on the GPRS/EDGE standard specification, and therefore has the same construction as the conventional art.

In the downlink dummy control block of FIG. 3, an identification bit 38 representing the inclusion or non-inclusion of data and data bits 39 that are added in place of padding bits 28 of a control message contents field of FIG. 2.

The identification bit 38 is a bit representing whether or not the data bits 39 are contained in the downlink dummy control block that is broadcast from a BS to an MS. FIG. 3 illustrates the state in which the identification bit 38 is equal to "1," which indicates that the data bits 39 are contained in the downlink dummy control block and, if the identification bit 38 is equal to "0" indicates that the data bits 39 are not contained in the downlink dummy control block.

One bit is used to represent whether or not data bits are contained in the downlink dummy control block, however, there is no need to limit the bit number and the position to a scheme illustrated in FIG. 3 and modification may be made by one skilled in the art.

The operation of transmitting a downlink dummy control block from a BS to an MS is performed several times per second, and therefore there is no need to add data bits every time a downlink dummy control block is transmitted. Thus, as shown in FIG. 3, the identification bit 38 may be provided to indicate whether or not the data bits 39 are contained in the broadcasted downlink dummy control block. If the data bits 39 are not contained in the downlink dummy control block broadcasted to an MS, padding bits 28 are used as in the conventional art.

A configuration scheme of a control message contents field of the downlink dummy control block of FIG. 3 is described below.

```
< Message Type : bit (6) >
< Packet Downlink Dummy Control Block message content > ::=
< PAGE_MODE : bit (2) >
{ 0 | 1 <PERSISTENCE_LEVEL : bit (4) > * 4 }
{ 0 | 1 <Data block header> <Data block contents > }
! < Distribution part error : bit (*) = < no string > > ;
```

The "<padding bits>" part of the conventional art is replaced with "{0|1< Data block header> <Data block contents>}" and the "0|1" part represents whether or not data bits are added as aforementioned. The "<Data block header>" part signifies a header including information on the data bits 39 added in place of the padding bits 28. The "<Data block contents>" part signifies a substantial data contents part.

Figure 4:
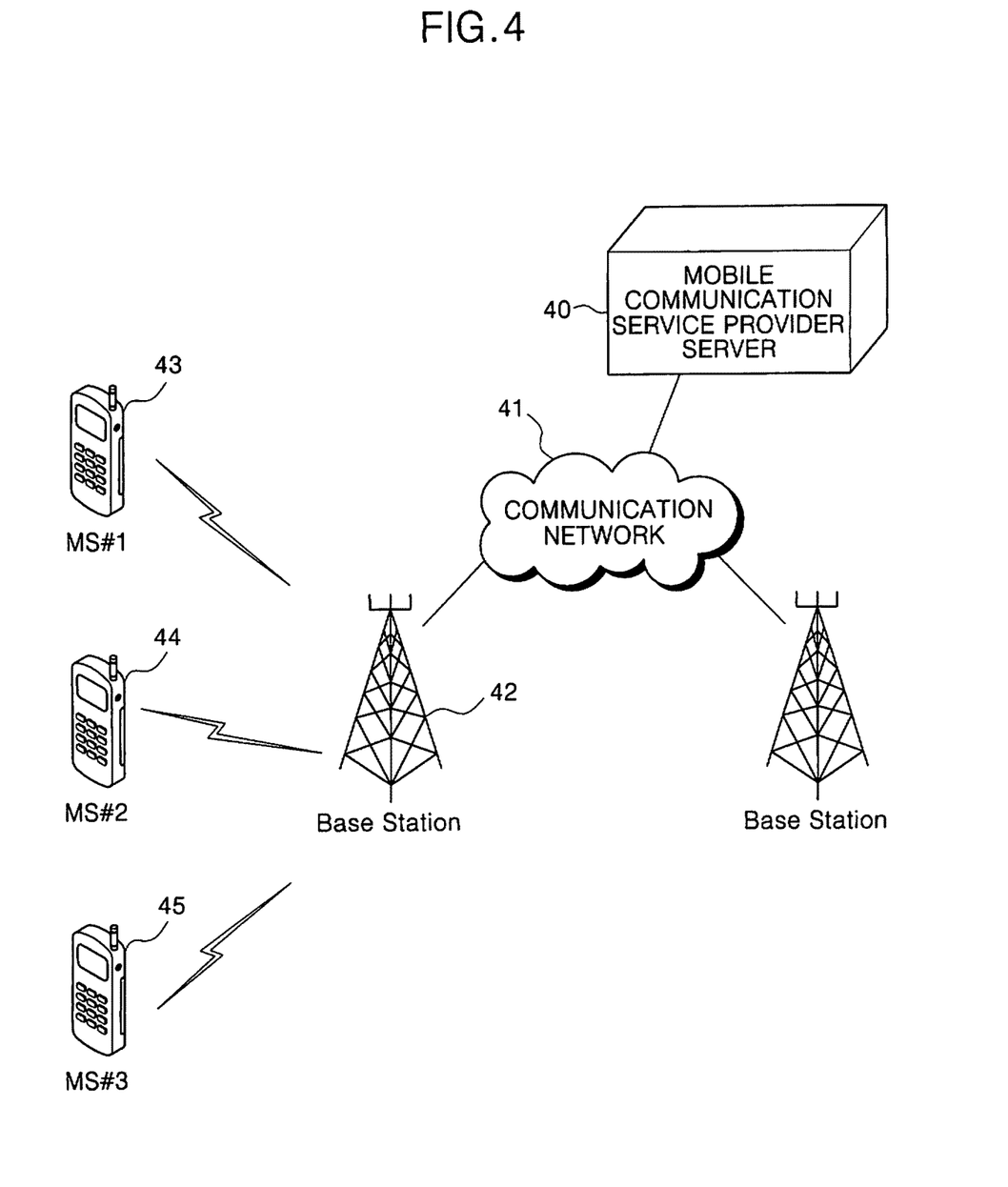
FIG. 4 is a diagram illustrating a construction of a mobile communication system using a method for transmitting data according to an exemplary embodiment of the present invention.

FIG. 4 is a diagram illustrating a construction of a mobile communication system using a method for transmitting data according to an exemplary embodiment of the present invention.

As shown in FIG. 4, the mobile communication system using the data transmission method includes a mobile communication service provider server 40, a communication network 41, a BS 42 and a plurality of MSs 43, 44 and 45.

The mobile communication service provider server 40 stores content to be provided to the MSs and sends the stored contents to each MS 43, 44, and 45 through the BS 42 over the communication network 41.

A storage region for the content to be provided to the MS is not limited to the mobile communication service provider server 40. That is, a separate contents storage region can be also provided in the BS 42. In this case, the mobile communication service provider server 40 is not limited as a constituent element essential to the mobile communication system using the data transmission method according to an exemplary embodiment of the present invention. However, in the specification, a description of exemplary embodiments is made on the basis of a mode in which the content is stored in the mobile communication service provider server 40.

The downlink dummy control block is transmitted in such a manner that the BS 42 broadcasts to each MS 43, 44, and 45. Therefore, content transmitted to each MS 43, 44, and 45 using the downlink dummy control block may be news, life information, etc. continuously updated and displayed on a part of a display of the MS.

If data is included in the downlink dummy control block and transmitted according to the present invention, a quantity of data included in one downlink dummy control block is limited because of a frame standard of the downlink dummy control block. Thus, the data included in the downlink dummy control block may be weather information, stock price information, brief new information, etc. rather than a large capacity of data such as a moving picture file, a photography file, and a music file.

Figure 5:
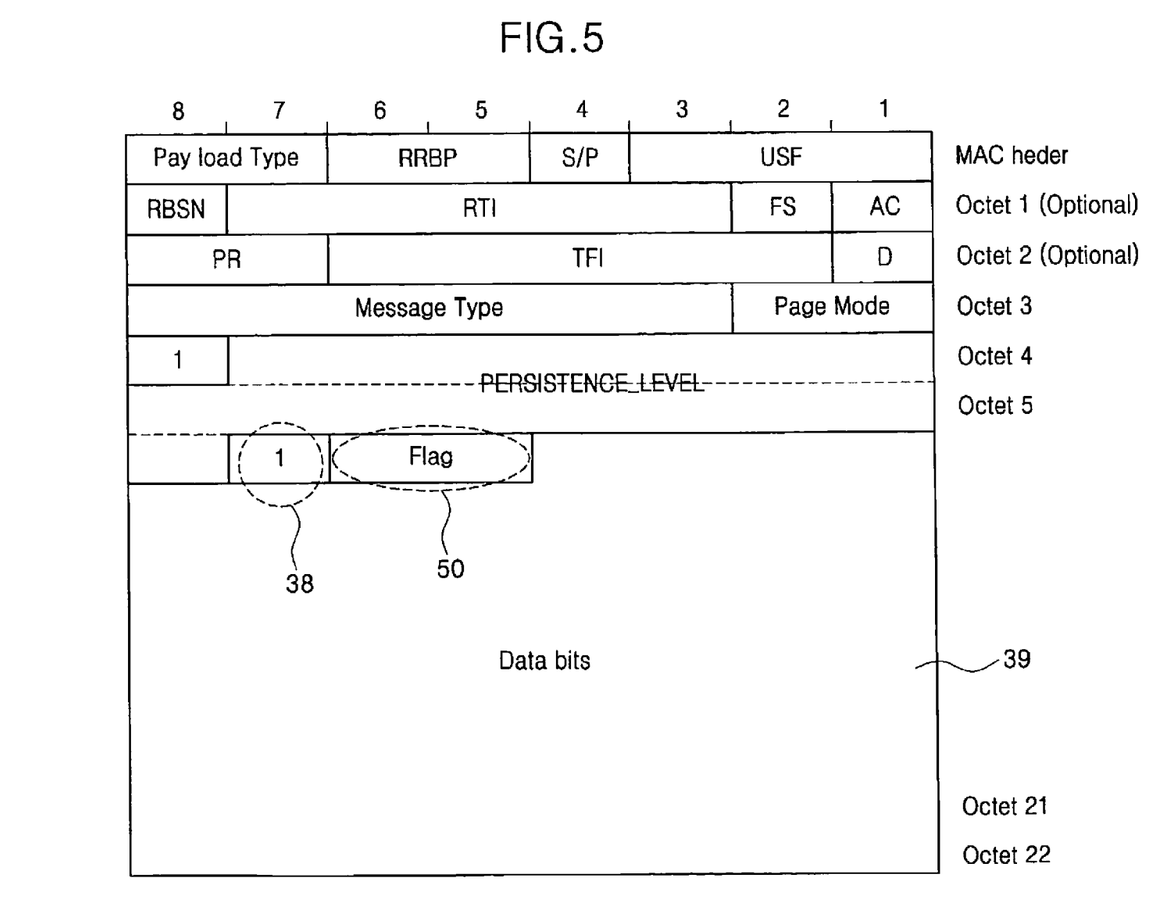
FIGS. 5 and 6 are diagrams illustrating structures of downlink dummy control blocks according to other exemplary embodiments of the present invention.
Figure 6:
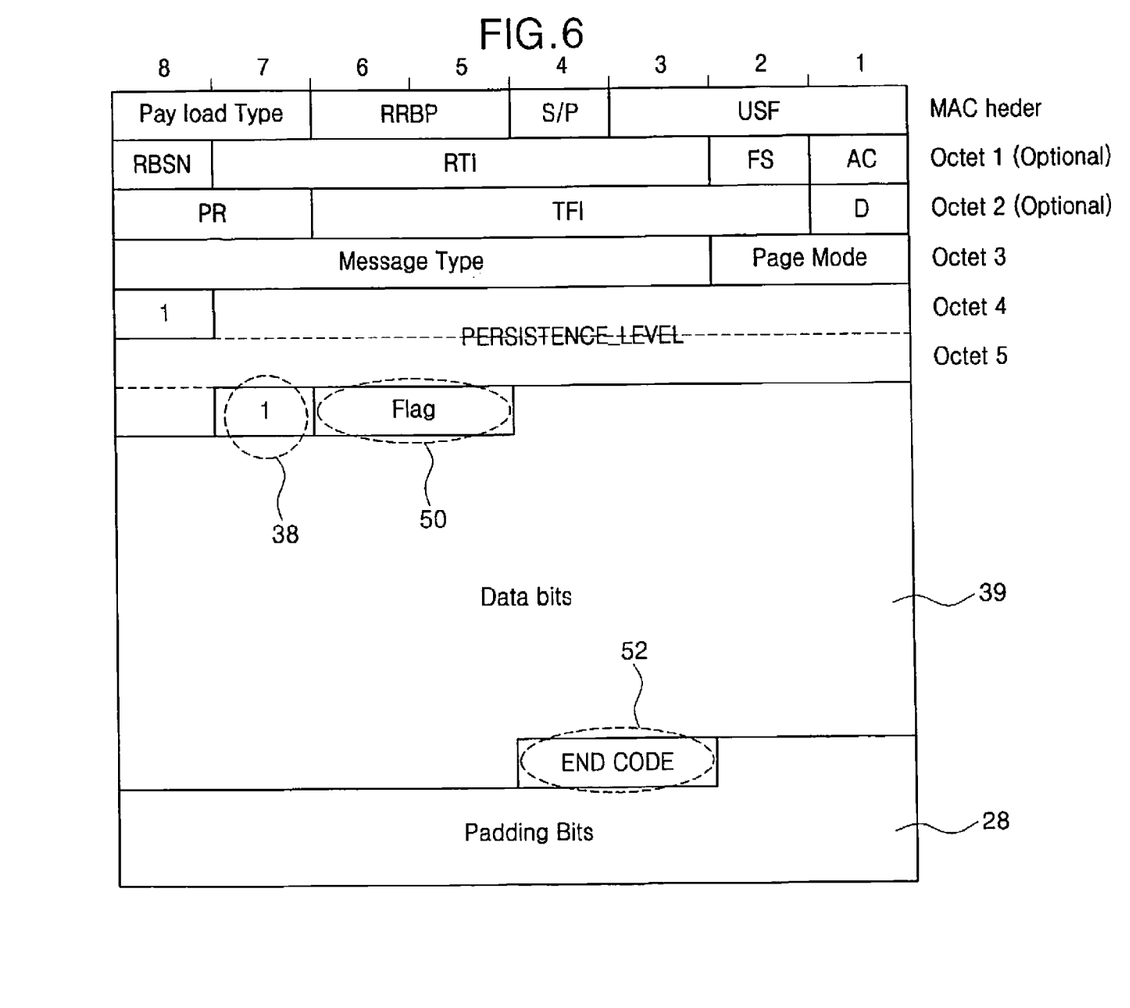

FIGS. 5 and 6 are diagrams illustrating structures of downlink dummy control blocks according to other exemplary embodiments of the present invention. In FIG. 5, a flag 50 for distinguishing data bits 39 from other parameter bits is added. In FIG. 6, a flag 50, an end code 52 for indicating an end of data bits 39 and padding bits 54 are added. The flag 50 also performs a function of informing a start of the data bits 39.

Because the downlink dummy control block broadcasted from the BS 42 to each MS 43, 44 and 45 includes several parameters inclusive of an MAC header, the data bits 39 can be filled in a field in which padding bits are filled. If so, the flag 50 can be added so that each MS 43, 44 and 45 can accurately recognize and extract the data bit field.

Because it may occur that the data bits 39 filled in place of padding bits 28 are not is enough in capacity to fill all remnant octets of the downlink dummy control block, the end code 52 for indicating the end of the data bits 39 can be also added. In the case of adding the end code 52, a remnant octet field of the downlink dummy control block may be filled with the padding bits 28.

In addition to a method of adding the code 52 for indicating the end of the data bits 39, a method of adding information on a length of the data bits 39 included in the downlink dummy control block is possible. By adding the information on the length of the data bits 39 to the downlink dummy control block, an MS can be allowed to accurately recognize and extract the inserted data bits 39 when receiving the downlink dummy control block.

Figure 7:
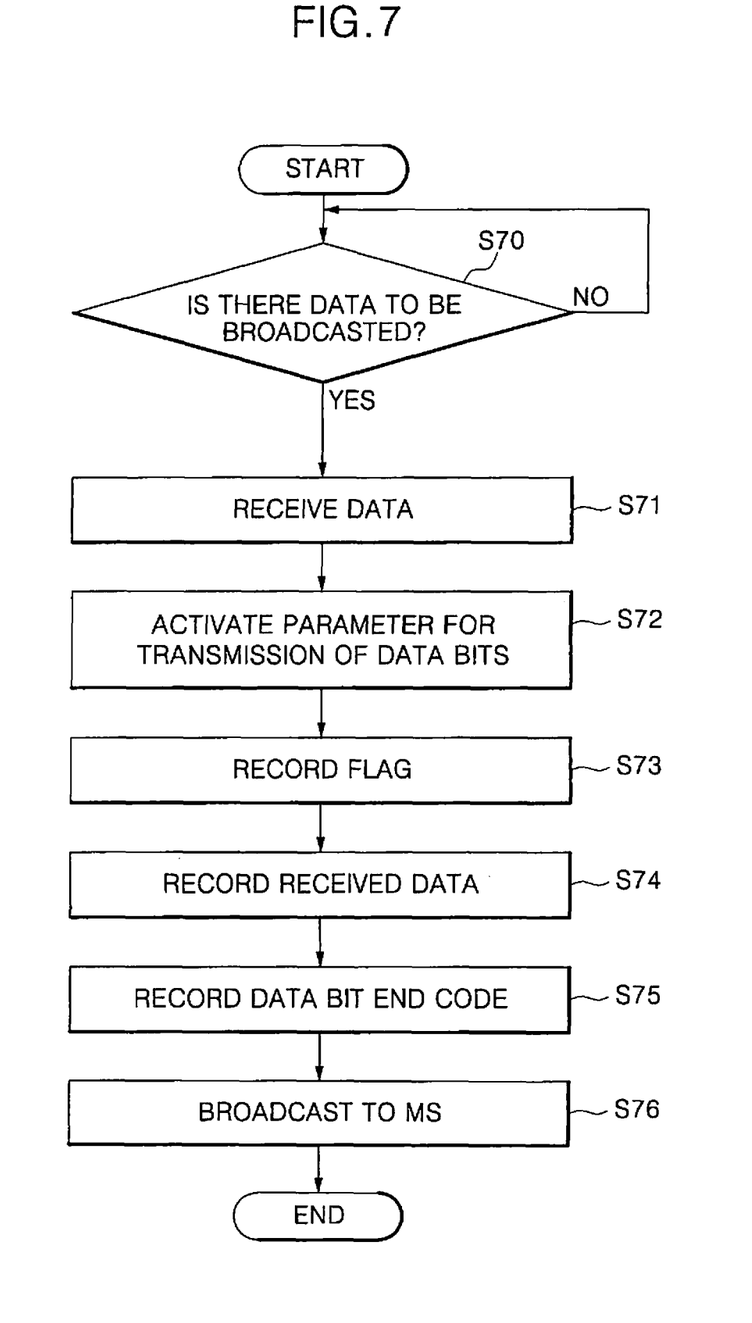
FIG. 7 is a flow diagram illustrating a method for transmitting data according to an exemplary embodiment of the present invention.

FIG. 7 is a flow diagram illustrating a method for transmitting data according to an exemplary embodiment of the present invention.

An example of a service of updating and displaying stock price information every 20 minutes at a bottom of a screen of an MS by providing the stock price information to the MS every 20 minutes is utilized, but other services are contemplated.

Stock price information to be provided to an MS is stored in the mobile communication service provider server 40. It is determined whether there is a need to again provide stock price information that is updated 20 minutes after stock price information has been provided to the MS in step S70. If there is a need to provide the stock price information again, stock price information data is received from the mobile communication service provider server 40 in step S71. Otherwise, step S70 is repeatedly performed. Then, if the stock price information is inserted into a downlink dummy control block to be transmitted to the MS, an identification bit 38 for indicating that data bits are inserted into the downlink dummy control block is added in step S72. As its example, the identification bit 38 is recorded by '1' in FIG. 6.

Because a field filled with padding bits in the conventional art is filled with data bits, a flag is recorded so that the MS can accurately detect the data bit field from the downlink dummy control block into which the data bits are inserted in step S73. After that, the stock price information data received from the mobile communication service provider server 40 is inserted into the downlink dummy control block in step S74.

If the insertion of the stock price information data is completed, an end code 52 for indicating that the insertion of the data bits is completed is recorded in step S75. If there are remnant octets in the downlink dummy control block even after the data bits on the stock price information are recorded, the remnant octets may be filled with padding bits when necessary.

If the recording of the data bits in the downlink dummy control block is completed, the downlink dummy control block is broadcasted from a BS to the MS in step S76. The MS may receive the broadcasted downlink dummy control block, detect the data bits on the stock price information, and display the stock price information on a screen of the MS.

Figure 8:
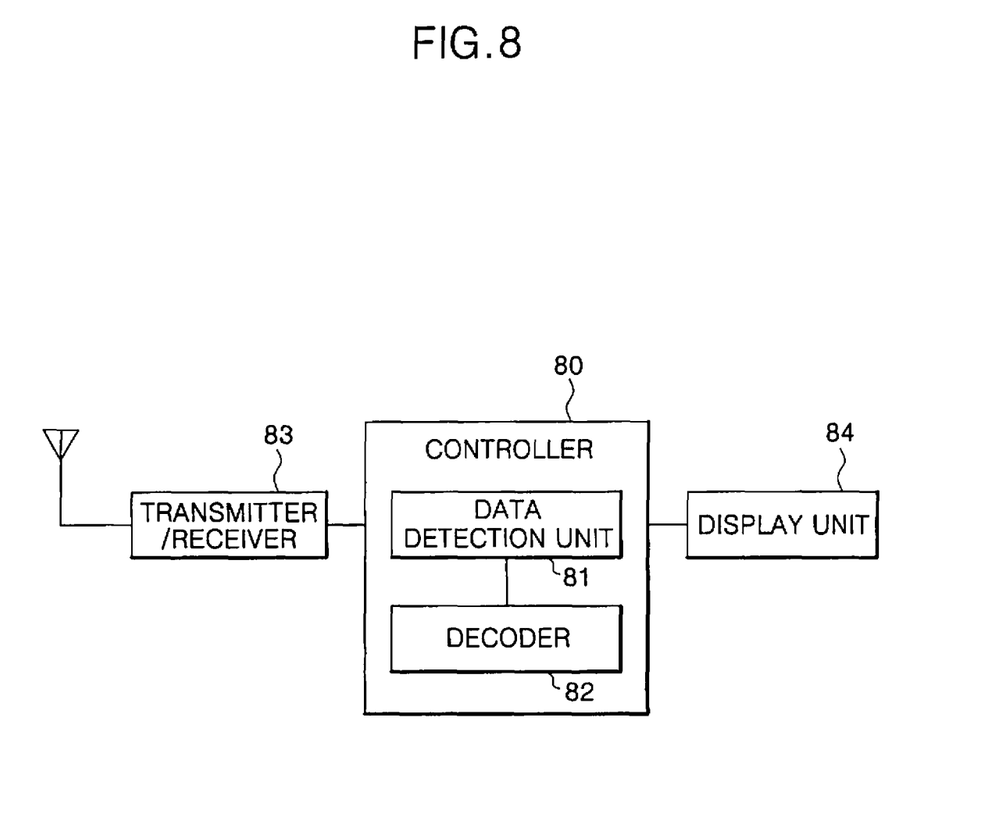
FIG. 8 is a block diagram illustrating a construction of an MS using a method for transmitting data according to an exemplary embodiment of the present invention.

FIG. 8 is a block diagram illustrating a construction of an MS using a method for transmitting data according to an exemplary embodiment of the present invention.

As shown in FIG. 8, the MS includes a controller 80, a transmitter/receiver 83, and a display unit 84. The controller 80 includes a data detection unit 81 and a decoder 82.

The transmitter/receiver 83 receives a downlink dummy control block broadcast from a BS and provides the received downlink dummy control block to the controller 80. The transmitter/receiver 83 can connect with an antenna according to need.

The controller 80 extracts data from the downlink dummy control block received through the transmitter/receiver 83 and displays the extracted data on the display unit 84. The data detection unit 81 checks whether or not data bits are recorded in the downlink dummy control block and extracts only a data bit field. The data detection unit 81 can easily determine whether or not the data bits are inserted into the received downlink dummy control block, by using an identification bit 38 containing information on whether or not the data bits are inserted into the downlink dummy control block. Also, the data detection unit 81 can more accurately rapidly extract only the data bit field by using a flag 50 for indicating a record start of the data bits and an end code 52 for indicating the end of the data bits.

The decoder 82 decodes the data bits extracted by the data detection unit 81 and converts the data bits into a data form that can be displayed on the display unit 84.

The display unit 84 displays the decoded data under the control of the controller 80. The display unit 84 can be a Liquid Crystal Display (LCD) or an Organic Light Emitting Diode (OLED). The display unit 84 displays information necessary for operation of an MS and execution of a diversity of kinds of functions in addition to the decoded data.

Figure 9A:
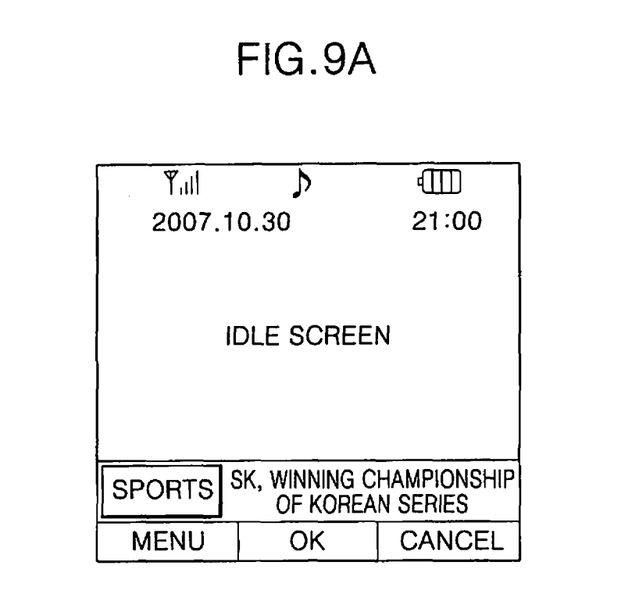
FIGS. 9A to 9C are diagrams illustrating examples of a pop-up window displayed in a screen of an MS according to an exemplary embodiment of the present invention.
Figure 9B:
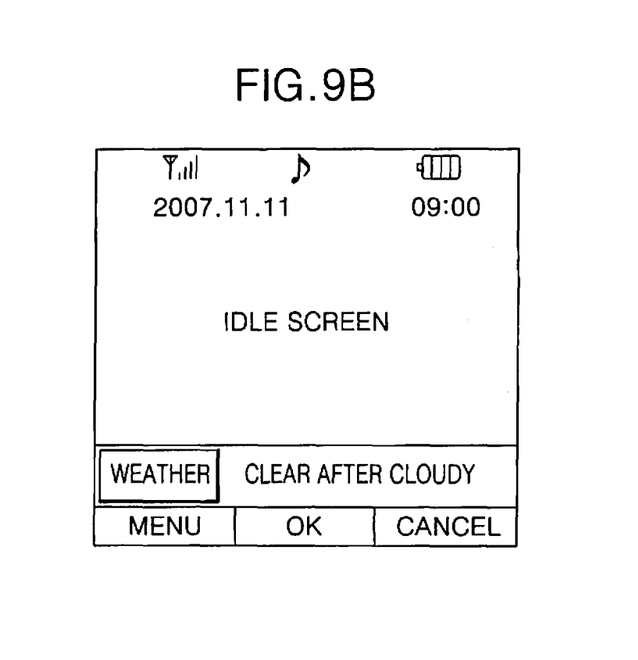
Figure 9C:
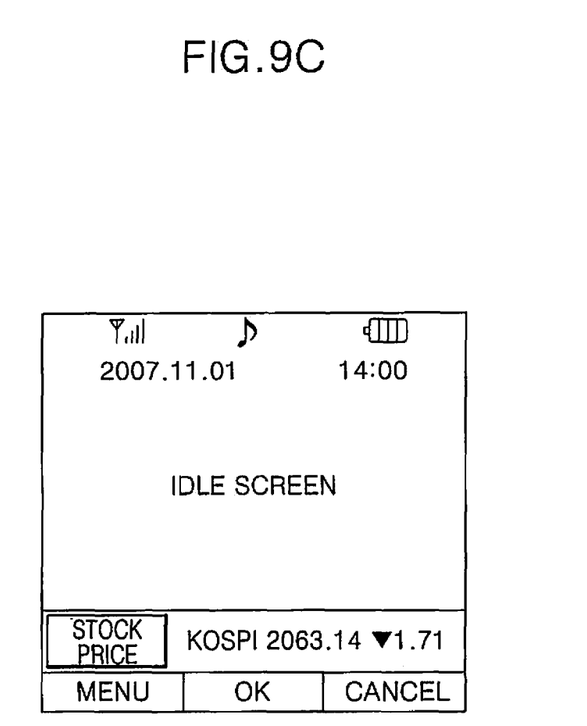

FIGS. 9A to 9C are diagrams illustrating examples of a pop-up window displayed on a screen of an MS according to an exemplary embodiment of the present invention.

As described with reference to FIG. 8, if the MS receives a downlink dummy control block broadcasted from a BS, the controller 80 of the MS can extract and display data on news, weather information, stock price information, traffic information, etc. on the display unit 84.

FIGS. 9A to 9C show examples of displaying sports news, weather information, and stock price information at a bottom of the display unit 84 of the MS, respectively. Since the quantity of data bits, which can be inserted into a downlink dummy control block, is limited, a small capacity of data such as life information shown in FIGS. 9A to 9C is suitable. The life information is more suitable to use the downlink dummy control block since the life information is not data exchanged between MSs but data broadcast from a BS to an MS.

However, though FIGS. 9A to 9C show, for example, news, weather information, stock price information, traffic information, etc., a new type of information would be provided in accordance with a future mobile communication service and data on the information would be transmitted using a downlink dummy control block as proposed in the present invention.

As described above, in a method for transmitting data according to the present invention, a field filled with padding bits in a downlink dummy control block broadcasted from a BS to an MS is used as a field for data transmission, thereby increasing practical applications of radio resources in a mobile communication environment. Unlike the conventional art, separate resources do not have to be allocated to broadcast life information or news to the MS and therefore, an additional data transmission work or power consumption can be prevented.

Desirable exemplary embodiments of the present invention have been described with reference to the accompanying drawings as above. Terms or words used throughout this specification and claims should not be limitedly construed as general meaning but should be construed as meaning and concepts according with the technical spirit of the present invention.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for transmitting downlink data in a General Packet Radio Service (GPRS)/Enhanced Data for Global System for Mobile (GSM) Evolution (EDGE) based mobile communication system, the method comprising:
   receiving, by a Base Station (BS), data to be broadcast to at least one Mobile Station (MS) from a mobile communication service provider server;
   inserting, by the BS, the received data into a padding bit field within a downlink dummy control block;
   inserting, by the BS, an identification bit into the downlink dummy control block for indicating that the received data is inserted into the downlink dummy control block; and broadcasting the downlink dummy control block to the at least one MS,
   wherein the downlink dummy control block is used in allocation of an Uplink State Flag (USF) in an uplink Temporary Block Flow (TBF) mode following channel dynamic allocation.

2. The method of claim 1, further comprising:
   adding a flag for indicating a start of data to be inserted to the downlink dummy control block transmitted from the BS to the MS.

3. The method of claim 2, further comprising: adding a code for indicating an end of the inserted data to the downlink dummy control block.

4. The method of claim 2, further comprising: adding a bit containing information on a length of the inserted data, to the downlink dummy control block.

5. A General Packet Radio Service (GPRS)/Enhanced Data for Global System for Mobile (GSM) Evolution (EDGE) mobile communication system, comprising:
   a BS for storing content data to be provided to an MS, inserting the content data into a field filled with padding bits within a downlink dummy control block, inserting an identification bit into the downlink dummy control block for indicating that the received data is inserted into the downlink dummy control block, and broadcasting the downlink dummy control block; and
   an MS for receiving the broadcasted downlink dummy control block, extracting the inserted content data from the received downlink dummy control block, and displaying the content data on a display of the MS,
   wherein the downlink dummy control block is used in allocation of an Uplink State Flag (USF) in an uplink Temporary Block Flow (TBF) mode following channel dynamic allocation.

6. The system of claim 5, wherein the content data is broadcast type information comprising as least one of news, weather information, and stock price information.

7. The system of claim 5, further comprising: a mobile communication service provider server for providing content data to be provided to the MS.

8. The system of claim 5, wherein the broadcasted downlink dummy control block comprises: a Medium Access Control (MAC) header, content data, and a flag for indicating that the contents data is inserted.

9. A General Packet Radio Service (GPRS)/Enhanced Data for Global System for Mobile (GSM) Evolution (EDGE) mobile station, the MS comprising:
   a transmitter/receiver for receiving a downlink dummy control block broadcast from a BS; and
   a controller for extracting content data included in the received downlink dummy control block and displaying the extracted contents data on a display of the MS,
   wherein the downlink dummy control block includes an identification bit indicating insertion of the content data into the downlink dummy control block,
   wherein the downlink dummy control block is used in allocation of an Uplink State Flag (USF) in an uplink Temporary Block Flow (TBF) mode following channel dynamic allocation.

10. The MS of claim 9, wherein the controller comprises:
   a data detection unit for extracting the content data included in the received downlink dummy control block; and
   a decoder for decoding the extracted data.

* * * * *